(12) United States Patent
Pietrantoni et al.

(10) Patent No.: US 7,296,572 B2
(45) Date of Patent: Nov. 20, 2007

(54) DEVICE FOR ADJUSTING LID COVER FOR OXYGEN MASK DISPENSING CONTAINER

(75) Inventors: Dennis P. Pietrantoni, Lancaster, NY (US); Jeffrey M. Sabin, Lewiston, NY (US); Scott J. Tokasz, Orchard Park, NY (US)

(73) Assignee: AVOX Systems Inc., Lancaster, NY (US)

( * ) Notice: Subject to any disclaimer, the term of this patent is extended or adjusted under 35 U.S.C. 154(b) by 594 days.

(21) Appl. No.: 10/339,801

(22) Filed: Jan. 10, 2003

(65) Prior Publication Data

US 2003/0160549 A1 Aug. 28, 2003

Related U.S. Application Data

(60) Provisional application No. 60/347,803, filed on Jan. 10, 2002.

(51) Int. Cl.
*A62B 9/04* (2006.01)
*A62B 18/08* (2006.01)
*B65D 43/14* (2006.01)

(52) U.S. Cl. ............ 128/202.27; 128/206.27; 220/836

(58) Field of Classification Search ........... 128/202.27, 128/206.27; 220/836, 837, 845, 254.1, 254.3, 220/254.5, 263, 264, 284, 245; 244/118.5
See application file for complete search history.

(56) References Cited

U.S. PATENT DOCUMENTS

| | | | | |
|---|---|---|---|---|
| 2,931,355 A | * | 4/1960 | Miller et al. ........... | 128/204.29 |
| 3,503,394 A | * | 3/1970 | Hotz et al. ............ | 128/206.27 |
| 3,981,302 A | * | 9/1976 | Veit ...................... | 128/202.26 |
| 4,154,237 A | * | 5/1979 | Courter ................. | 128/206.27 |
| 4,375,863 A | * | 3/1983 | Kappler ................. | 220/830 |
| 4,475,752 A | * | 10/1984 | McKenna ............. | 292/210 |
| 4,481,945 A | * | 11/1984 | Levine .................. | 128/206.27 |
| 4,840,171 A | * | 6/1989 | Rohling et al. ........ | 128/204.18 |
| 4,909,247 A | * | 3/1990 | Terrisse et al. ........ | 128/206.27 |
| 5,803,062 A | * | 9/1998 | Aulgur .................. | 128/202.26 |
| 6,318,364 B1 | * | 11/2001 | Ford et al. ............. | 128/204.18 |
| 6,336,667 B1 | * | 1/2002 | Ford et al. .............. | 292/25 |
| 6,497,386 B2 | * | 12/2002 | Martinez ............... | 244/118.5 |
| 6,913,016 B2 | * | 7/2005 | Pietrantoni ............ | 128/204.29 |

FOREIGN PATENT DOCUMENTS

DE 199 44 655 C1 * 2/2001

* cited by examiner

*Primary Examiner*—Teena Mitchell
(74) *Attorney, Agent, or Firm*—Hodgson Russ LLP

(57) ABSTRACT

A device for adjusting a lid cover for an oxygen mask dispensing container. The device includes a stationary plate having a cover that is adjustable relative to the plate by means of a spring such that an outermost lid cover is capable of easily mating with the opening in the interior lining of an aircraft. The lid is spring-biased toward the plate such that when the plate is attached to the oxygen mask dispensing container body, the lid is automatically pulled into position relative to the opening in the interior lining of the aircraft.

15 Claims, 5 Drawing Sheets

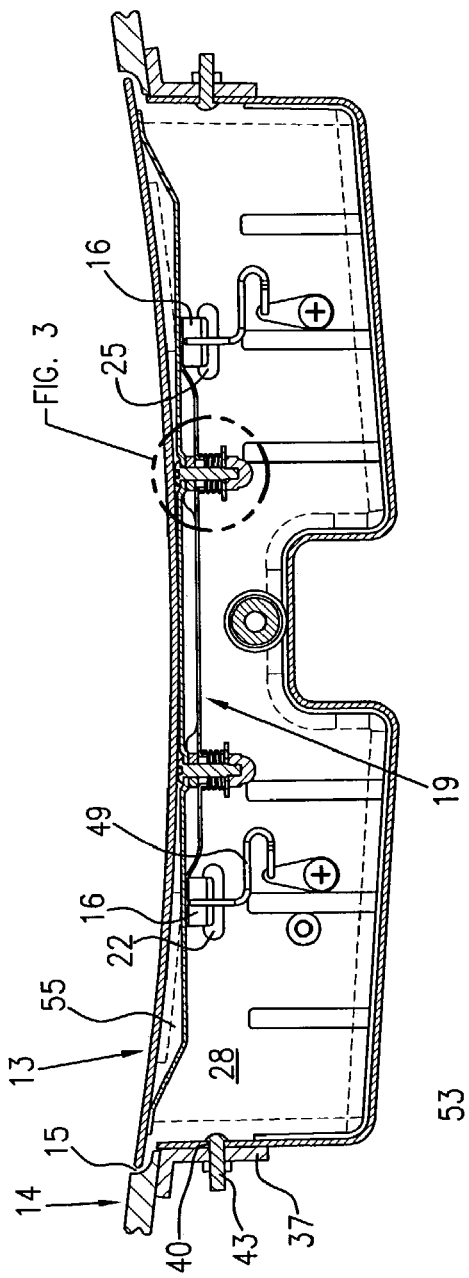
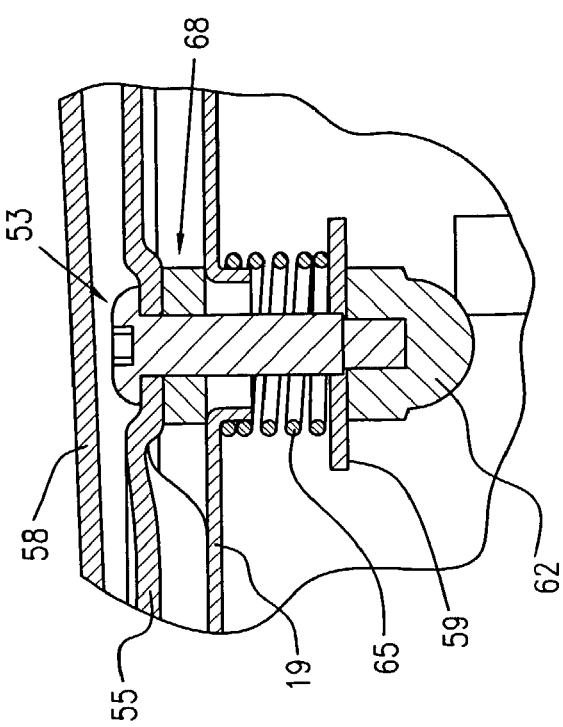

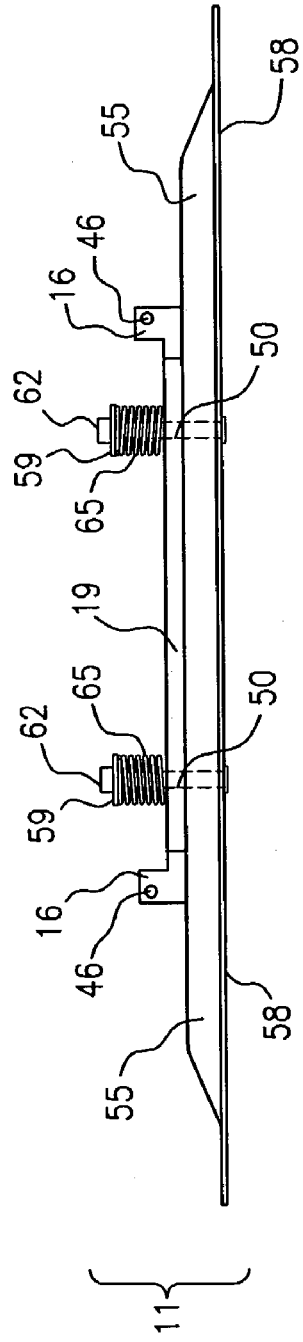
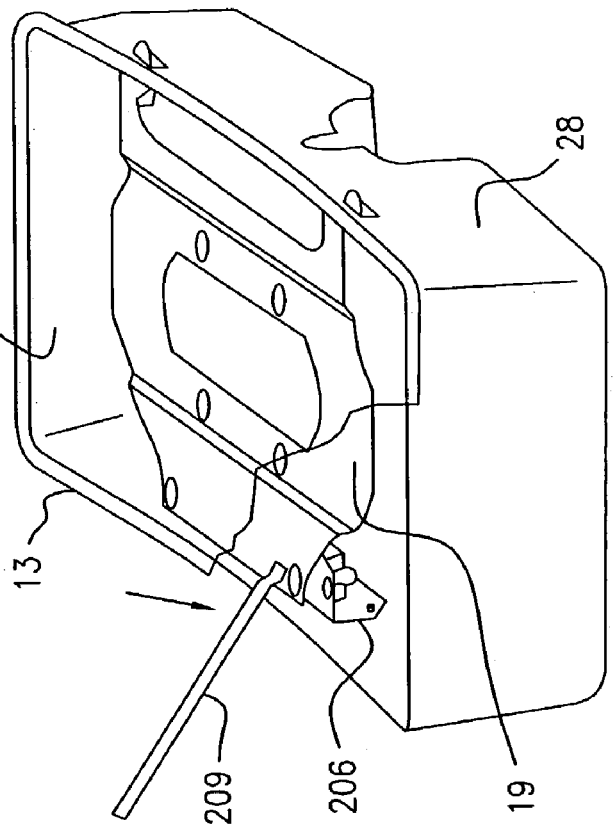
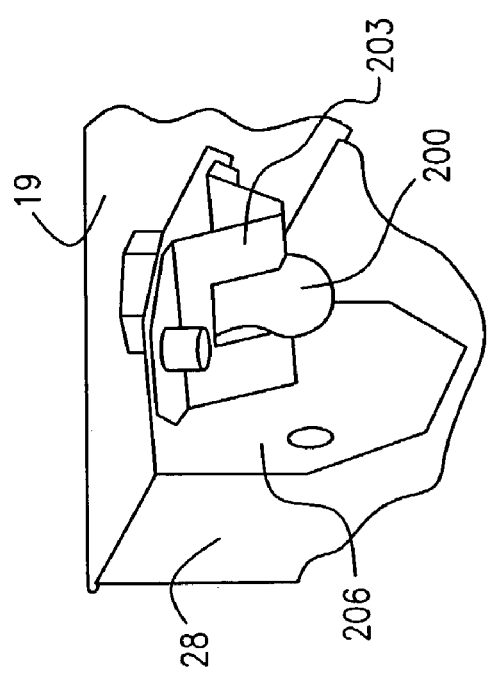
FIG. 5
FIG. 6
FIG. 7

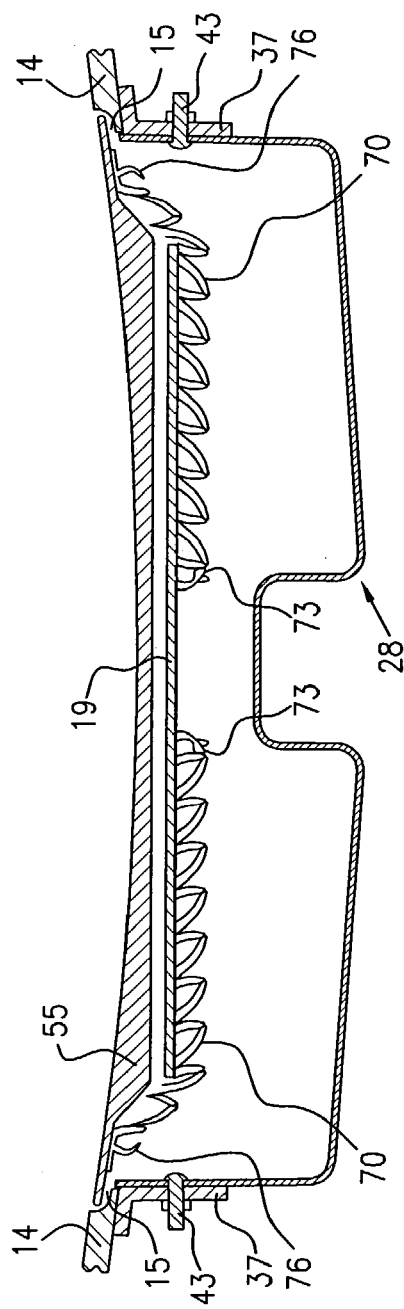
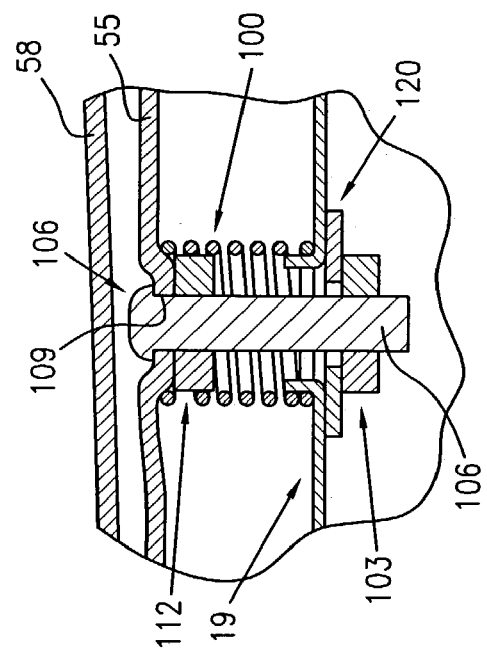

DEVICE FOR ADJUSTING LID COVER FOR OXYGEN MASK DISPENSING CONTAINER

CROSS-REFERENCE TO RELATED APPLICATION

Applicant hereby claims priority based on U.S. Provisional Application No. 60/347,803 filed Jan. 10, 2002, entitled "Device for Adjusting Lid Cover for Oxygen Mask Dispensing Container."

BACKGROUND OF THE INVENTION

Oxygen mask dispensing containers are mounted such that the masks can be displayed readily to aircraft passengers in an emergency. Accordingly, the mask containers are generally recessed into the ceiling over the passenger's seat, into the wall along side the passenger, or into the back of the seat in front of the passenger. The containers are typically designed so that the covers can be released remotely in the event of an aircraft decompression. This release may be electrical through solenoids or pneumatic by way of charging the oxygen distribution system from a central location in the aircraft. When released the covers generally fall away from the boxes, allowing the masks to fall free in front of the passengers or to be displayed within easy reach of the passengers. Because the oxygen masks are only displayed in an emergency, aircraft manufacturers and operators want this emergency equipment to be stowed such that it does not call attention to itself until actually required during an emergency. Therefore interior designers want the oxygen mask containers to blend as seamlessly as possible within the ceiling panel or wall panel or seat back where the container is installed. However, in an emergency, the cover has to reliably fall away, exposing the oxygen masks for use. Also, in an aircraft there is almost constant vibration and it is very hard to align doors and covers precisely and to keep them in precise alignment through the vibration of countless landings and takeoffs. Accordingly, there is a need for a device for aligning the cover of an oxygen mask dispensing container.

SUMMARY OF THE INVENTION

The present invention meets the above-described need by providing an easy way to make the cover blend almost seamlessly with the ceiling panel, wall, or seat back panel where the oxygen mask container is installed. The present invention provides a self adjusting lid assembly for an oxygen mask dispensing container body. The lid assembly includes a lid having at least one guide disposed thereon. A plate capable of moving relative to the lid is disposed along the at least one guide. The plate is capable of being attached to the container body and is biased toward the lid.

BRIEF DESCRIPTION OF THE DRAWINGS

The invention is illustrated in the drawings in which like reference characters designate the same or similar parts throughout the figures of which:

FIG. 2 is a sectional view taken along lines 2-2 of FIG. 1;

FIG. 3 is partial detailed view taken from FIG. 2;

FIG. 5 is side elevational view of the lid assembly shown in FIG. 4;

FIG. 6 is detailed view of the stud and latch for attaching the stationary plate of the lid assembly to the body of the container;

FIG. 7 is a perspective view of the stationary plate of the lid assembly being engaged with the latch on the body of the container by means of a lid tool;

FIG. 8 is a side elevational view of an alternate embodiment of the present invention; and, FIG. 9 is a partial detailed view of a second alternate embodiment of the present invention;

DETAILED DESCRIPTION

For the purposes of this specification, the term "spring" is defined as any elastic body or device that recovers or substantially recovers its original shape when released after being distorted. In the examples shown, a coil spring is disclosed. However, it will be obvious to those of ordinary skill in the art that leaf springs or any other body or device fitting the above definition would also be suitable.

Figure 1:
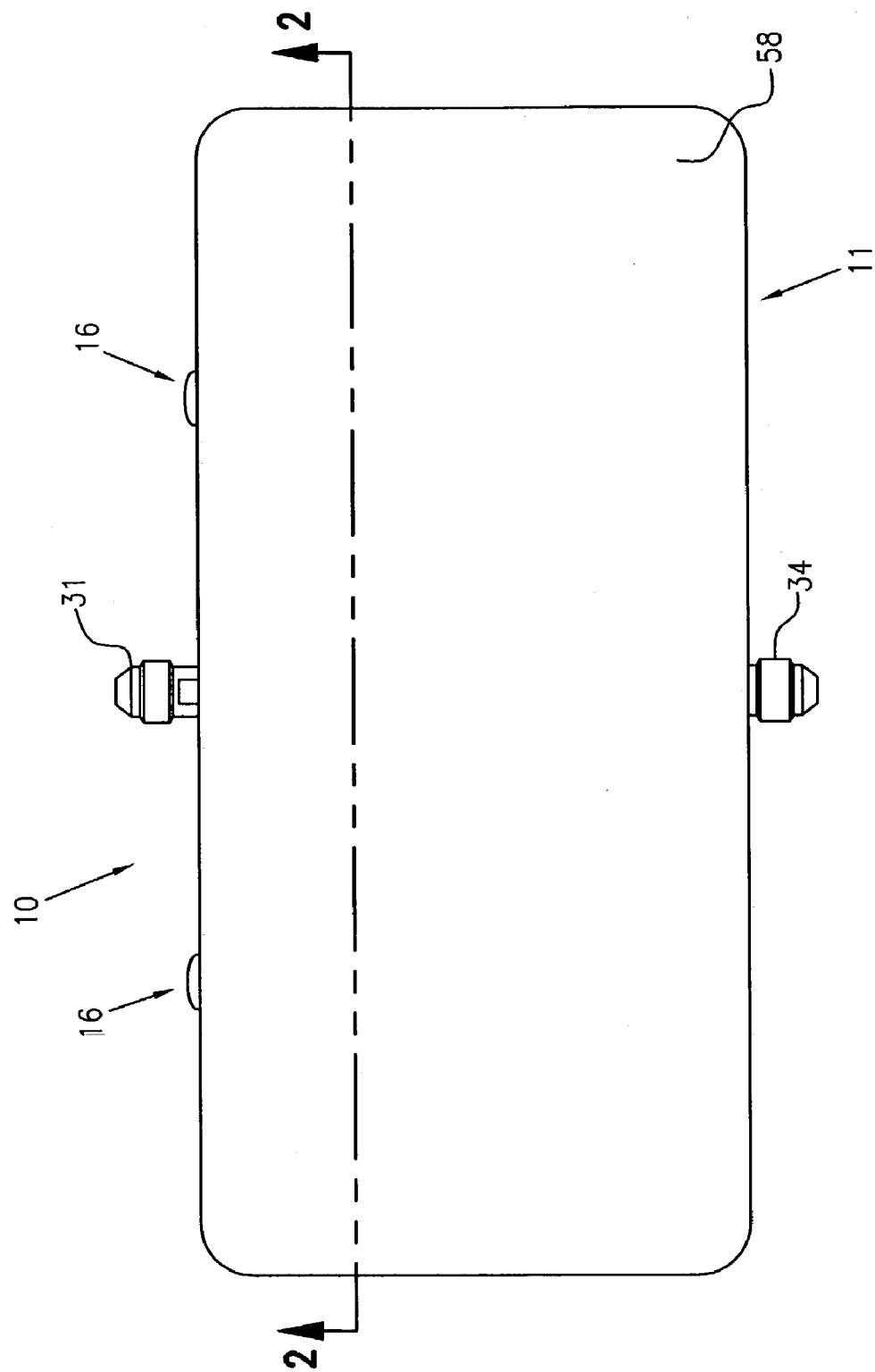
FIG. 1 is a top plan view of the oxygen mask dispensing container of the present invention.

In FIG. 1, an oxygen mask dispensing container 10 is mounted within an oxygen deployment area (not shown) of an aircraft typically located above the passenger seats in the ceiling of the aircraft. The container 10 may also be mounted in other locations in the interior of aircraft. The container 10 is typically rectangular. An openable lid assembly 11 has an outermost lid cover 58 designed to mate with the opening presented in the interior lining of the aircraft. It is important that the lid cover 58 of the container 10 present a seamless appearance with the interior lining of the aircraft for aesthetic reasons. Also, if the container 10 does not fit properly, the lid cover 58 may hang up on the edge of the opening in the interior lining and thereby interfere with the proper functioning of the mask deployment system.

As shown in FIG. 1, the lid cover 58 is generally rectangular with rounded corners. A pair of hinges 16 extend from a plate 19 (best shown in FIG. 4) that attaches the lid assembly 11 to the body 28 (FIG. 2) of the container 10 as described herein. A pair of breathing gas ports 31, 34 extend from opposite sides of the container 10 and are disposed such that they are capable of engaging with the breathing gas delivery system of the aircraft. In use in its stowed condition, the edges of lid cover 58 mate with the opening in the interior lining of the aircraft and hinges 16 and ports 31, 34 are not visible from inside the aircraft.

As will be described in greater detail hereinafter, the lid assembly 11 comprises the plate 19 and the lid 13. A first portion of the lid 13 is a lid cover 58 designed to mate seamlessly with the opening in the interior lining of an aircraft. Another portion of the lid 13 is a lid body 55 that mates with the opening in the container 10. As described below, the lid body 55 and the lid cover 58 may be integrally formed or may be separate members that are attached together.

In FIG. 2, the hinges 16 are separable type hinges that extend from the plate 19 and are disposed through a pair of openings 22, 25 in the body 28 of the container 10. During opening when the plate 19 pivots about the hinges 16, the hinges 16 slide out of the openings and the plate 19 separates completely from the body 28. As described hereafter, a pair of lanyards 49 restrict the fall of the plate 19 away from the body 28. The body 28 of the container 10 is typically attached inside the opening in the interior lining of the aircraft by means of L-shaped brackets 37 that are attached to the aircraft adjacent to the opening for container 10. The container 10 has slots 40 that receive bolts 43 for attaching the container 10 to the L-shaped brackets 37. The slots 40 may be elongated to provide for adjustment of the position of the container 10 inside the opening in the interior lining of the aircraft. The slots 40 are typically elongated such that the container 10 can be adjusted relative to how far the container 10 extends into the opening in the interior lining of the aircraft. As shown, the inner surface 14 of the interior lining may be provided with a recessed portion or ledge 15 for receiving the edge of the lid cover 58 so that the lid cover 58 and the surface of the interior lining are flush.

The hinges 16 on the plate 19 may be provided with an opening 46 (FIG. 5) for receiving a lanyard 49 such that when the plate 19 is deployed it is held by the lanyard 49 and does not free fall where it could strike the passenger. The hinges 16 are located at the rear of the plate 19.

Figure 4:
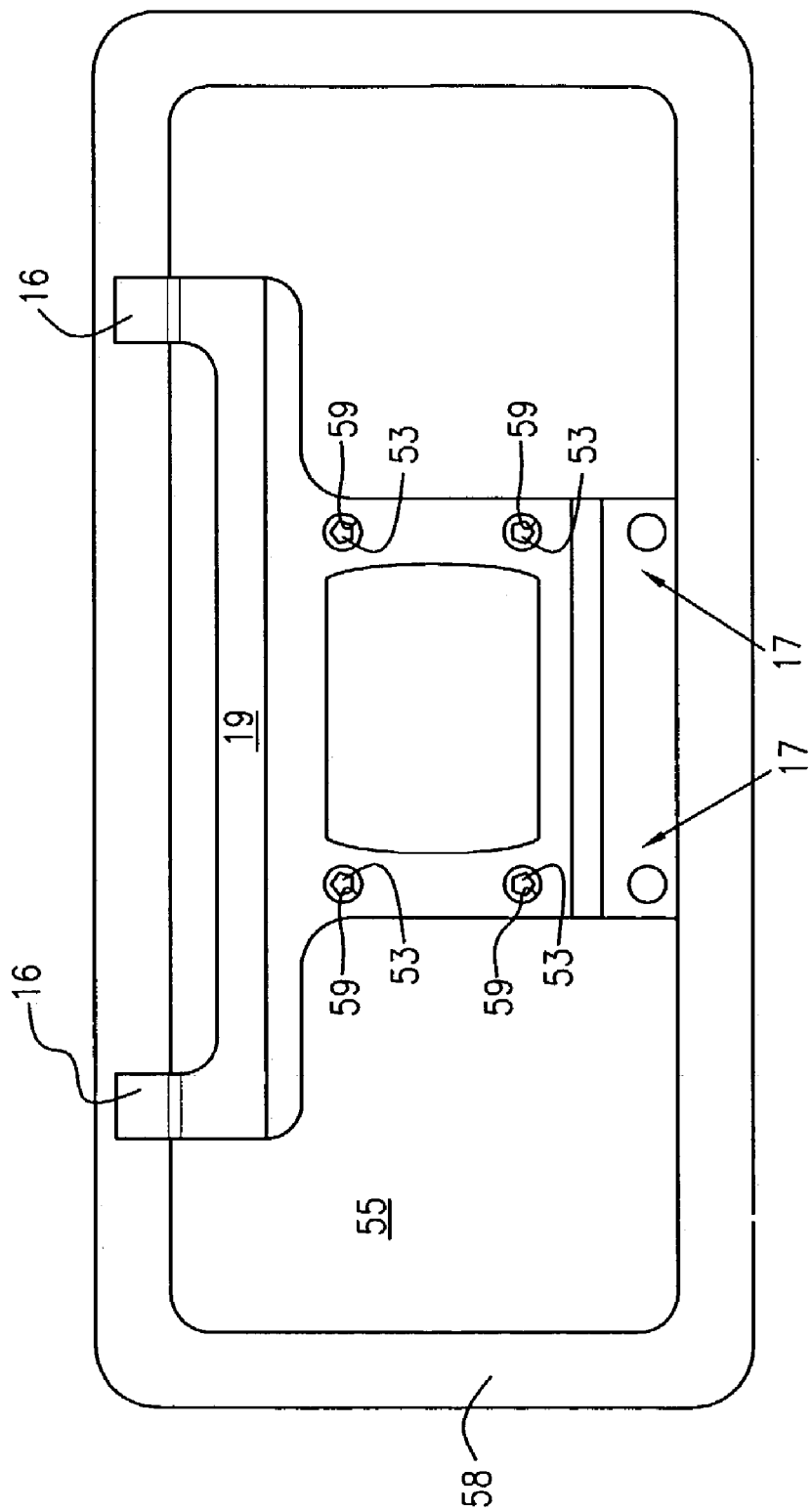
FIG. 4 is a plan view of the lid assembly of the present invention.

Referring to FIGS. 3-5, the lid assembly 11 includes a combination of elements that provide for the lid assembly 11 to be self adjusting with respect to its spatial orientation with the interior lining of the aircraft. As best shown in FIG. 5, the lid assembly 11 includes a stationary plate 19 that is typically formed out of metal that includes the hinges 16 at the back and includes a mounting arrangement 17 (FIG. 4) for the studs 200 at the front as described below. The stationary plate 19 also has four openings 50 for bolts 53 that are fixedly attached to the lid body 55 of the lid 13. The lid 13 has a lid body 55 and has a lid cover 58. The lid body 55 and lid cover 58 are illustrated as separate elements attached to form lid 13. However, the lid body 55 and lid cover 58 may be formed integrally as opposite sides of a unitary lid 13. The lid cover 58 is typically thin and may be flat or slightly curved depending on the shape of the interior lining. The lid cover 58 may be covered with a textured material to match the color and texture of the interior lining of the aircraft. At the opposite end of the bolts 53 a washer 59 and a nut 62 may be provided. A spring 65 is disposed between the stationary plate 19 and the washer 59. The washer 59 provides a stop to prevent the spring 65 from coming off of the end of the bolt 53. If the opening in the lid body 55 is not threaded, a locking nut 68 (FIG. 3) may also be used between the plate 19 and the lid body 55 to secure the bolt 53 to the lid body 55.

The stationary plate 19 is the structure of the lid assembly 11 that attaches directly to the body 28 of the container 10 as described in greater detail below. The position of the lid 13 relative to the plate 19 is automatically adjustable by means of the springs. Accordingly, the installation of the lid 13 is greatly simplified, and there are no manual adjustments between the plate 19 and the lid 13 required during installation of the container 10. The springs 65 allow for the hinges 16 on the plate 19 to be inserted in the openings 22, 25 in the body 28 of the container 10 while the orientation between the plate 19 and the lid 13 adjusts such that the lid cover 58 rests on the ledge 15 provided around the opening in the aircraft interior lining. When the plate 19 is attached to the body 28 of the container 10, the force of the springs 65 pulls the lid cover 58 into proper position on the ledge 15 surrounding the opening in the interior lining of the aircraft.

In addition to the adjustability resulting from the springs 65, there is also some adjustment available due to the clearance between the openings 50 in the stationary plate 19 and the four bolts 53.

It will be obvious to one of ordinary skill in the art that the arrangement of the bolts, washers and nuts, to form fixed posts extending from the lid body 55 may be varied. Other mechanical elements either specially manufactured or combined in other ways may also be used to form fixed posts extending from the lid body 55 through the stationary plate 19. The number and size of the posts may be varied. The bolts 53 provide fixed posts that comprise a guide for directing the motion of the plate 19 relative to the lid 13. Other mechanical elements may also be used to form guides. The guides may be disposed through the plate 19 as shown or along the edges of the plate 19, as will be evident to those of ordinary skill in the art. The motion of the plate 19 relative to the lid 13 is primarily in a direction perpendicular to the plane of the lid 13. However, the spaces around the posts provide for lateral and angular motion as well. Other types of guides may also provide for a range of motion for the plate 19 relative to the lid 13. As will be described in greater detail below, the biasing of the lid 13 relative to the stationary plate 19 may be done in many different ways as will be readily apparent to those of ordinary skill in the art.

Referring to FIGS. 6-7, at the front of the plate 19 a pair of studs 200 are provided for engaging with a latch 203 disposed inside the container 10. The latch 203 may be attached to the body 28 of the container 10 by means of an L-shaped bracket 206. In FIG. 6, a single stud 200 is shown engaged with a latch 203. The studs 200 releasably attach to the latch 203 and are typically capable of being automatically released by operation of a solenoid or pneumatically actuated piston or lever that strikes the plate 19 with enough force to overcome the frictional engagement of the studs 200 with the corresponding latches 203. Such lid release arrangements are known in the art, and are not per se, a part of this invention.

As will be evident to those of ordinary skill in the art, the plate 19 may be latched in numerous ways. For example, the plate 19 can be latched by applying a force to the outer cover 58. The outer cover 58 may be capable of deflecting such that it engages with the frame 19 to cause the studs 200 to engage with corresponding latches 203. As an alternative, a long narrow tool such as a screw driver or a tool as shown in FIG. 7 may be inserted between the floating lid 13 and the stationary plate 19 and pressed against the plate 19 to cause it to latch. In yet another alternative, a small aperture may be provided in the floating lid 13 to provide access to the plate 19 for a pin to push the plate 19 into engagement. In FIG. 7, in order to close and latch the container 10, a lid tool 209 may be used to slide between the floating lid 13 and the stationary plate 19, and the plate 19 is pushed in the area of the plate 19 near the latches 203 until the studs 200 engage with latches 203.

In FIG. 8, an alternate embodiment of the invention is shown. Instead of a coil spring 65 disposed around the bolts 53, the biasing member is a pair of coil springs 70 extending from hooks 73 on the plate 19 to hooks 76 on the lid body 55. Another variation could include a single spring disposed all the way across the plate 19. If bolts or posts are included to provide guidance between the plate 19 and the lid body 55, the washers and nuts may not be necessary at the end of the bolts because the springs are attached directly to the lid body 55. If the spring rate was sufficient, there may not be a risk of pulling the plate 19 completely off of the posts or bolts.

In FIG. 9 an alternate embodiment of the invention is shown. In this embodiment, a coil spring 100 is disposed on the opposite (compared to the first embodiment) side of the plate 19 such that the position of the lid body 55 can be adjusted by tightening or loosening the nuts 103 on the end of the bolts 106. The bolt 106 is disposed through an opening 109 in the lid body 55 and is fixedly attached by a nut 112. The coil spring 100 is disposed between the lid body 55 and the stationary plate 19. A nut 103 on the opposite side of the plate 19 provides for the adjustment of the position of the lid body 55 as described above. A washer 120 may also be provided between nut 103 and plate 19. In use, the lid 13 is attached to the body 28 of the container 10, by inserting hinges 16 into openings 22, 25 in the body 28, to test the fit between the lid cover 58 and the interior surface 14 of the airplane. If the alignment is not satisfactory, the lid 13 is removed and the nuts 103 are tightened or loosened to adjust the position of the lid cover 58 relative to the plate 19.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A self adjusting lid assembly for an oxygen mask dispensing container body, the lid assembly comprising:
    a plate capable of being attached to the container body;
    a lid having at least one guide disposed thereon, the lid being capable of moving relative to the plate along the guide; and,
    a spring biasing the lid toward the plate; and,
    wherein the plate is pivotally attached to the container body.

2. A self adjusting lid assembly for an oxygen mask dispensing container body, the lid assembly comprising:
    a plate capable of being attached to the container body;
    a lid having at least one guide disposed thereon, the lid being capable of moving relative to the plate along the guide; and,
    a spring biasing the lid toward the plate; and,
    wherein the spring is a coil spring having a first end and a second end, the first end attached to the plate and the second end attached to the lid.

3. A self adjusting lid assembly for an oxygen mask dispensing container body, the lid assembly comprising:
    a plate capable of being attached to the container body;
    a lid having at least one guide disposed thereon, the lid being capable of moving relative to the plate along the guide; and,
    a spring biasing the lid toward the plate; and, a lid tool sized to fit between the lid and the plate.

4. A self adjusting lid assembly for an oxygen mask dispensing container body, the lid assembly comprising:
    a plate of being attached to the container body;
    a lid having at least one guide disposed thereon, the lid being capable of moving relative to the plate along the guide; and,
    a spring biasing the lid toward the plate; and,
    wherein the lid has an aperture disposed therein to provide access for latching the plate.

5. A self adjusting lid assembly for an oxygen mask dispensing container body, the lid assembly comprising:
    a plate having a first side and a second side and capable of being attached to the container body;
    a lid disposed adjacent to the first side of the plate and having at least one guide disposed thereon, the guide having a stop, the lid being capable of moving relative to the plate along the guide; and,
    a spring disposed between the second side of the plate and the stop and biasing the lid toward the plate; and,
    wherein the plate is pivotally attached to the container body.

6. The lid assembly of claim 5, wherein the plate has a separable type hinge.

7. A self adjusting lid assembly for an oxygen mask dispensing container body, the lid assembly comprising:
    a plate having a first side and a second side and capable of being attached to the container body;
    a lid disposed adjacent to the first side of the plate and having at least one guide disposed thereon, the guide having a stop, the lid being capable of moving relative to the plate along the guide; and,
    a spring disposed between the second side of the plate and the stop and biasing the lid toward the plate; and,
    a lid tool sized to fit between the lid and the plate.

8. A self adjusting lid assembly for an oxygen mask dispensing container body, the lid assembly comprising:
    a plate having a first side and a second side and capable of being attached to the container body;
    a lid disposed adjacent to the first side of the plate and having at least one guide disposed thereon, the guide having a stop, the lid being capable of moving relative to the plate along the guide; and,
    a spring disposed between the second side of the plate and the stop and biasing the lid toward the plate; and,
    wherein the lid has an aperture disposed therein to provide access for latching the plate.

9. An adjustable lid assembly for an oxygen mask dispensing container body, the lid assembly comprising:
    a plate capable of being releasably attached to the container body;
    a lid having at least one guide disposed thereon, the lid capable of moving relative to the plate along the guide;
    a spring disposed between the lid and the plate; and,
    a locking member operatively associated with the guide such that the position of the plate relative to the lid is manually adjustable against the force of the spring.

10. The adjustable lid assembly of claim 9, wherein the guide comprises at least one post.

11. The adjustable lid assembly of claim 10, wherein the spring is disposed around the post.

12. The adjustable lid assembly of claim 9, wherein the plate is pivotally attached to the container body.

13. The lid assembly of claim 9, wherein the plate has a separable type hinge.

14. The lid assembly of claim 9, further comprising a lid tool sized to fit between the plate and the lid.

15. The lid assembly of claim 9, wherein the lid has an aperture disposed therein to provide access for latching the plate.

* * * * *